US007594676B2

United States Patent
Gibbons

(10) Patent No.: US 7,594,676 B2
(45) Date of Patent: Sep. 29, 2009

(54) EXTENDED OUTPUT INFLATOR DEVICE

(75) Inventor: Patrick J Gibbons, Lebanon, OH (US)

(73) Assignee: Delphi Technologies, Inc., Troy, MI (US)

( * ) Notice: Subject to any disclaimer, the term of this patent is extended or adjusted under 35 U.S.C. 154(b) by 409 days.

(21) Appl. No.: 11/461,285

(22) Filed: Jul. 31, 2006

(65) Prior Publication Data
US 2008/0042407 A1   Feb. 21, 2008

(51) Int. Cl.
*B60R 21/26*   (2006.01)
(52) U.S. Cl. .................................... 280/737
(58) Field of Classification Search ............. 280/736, 280/737, 740, 741; 102/530, 531
See application file for complete search history.

(56) References Cited

U.S. PATENT DOCUMENTS 5,709,406 A  *  1/1998  Buchanan ................. 280/737
6,834,885 B2 * 12/2004  Mizuno et al. ............ 280/737
6,981,718 B2 *  1/2006  Blackburn ................ 280/737

* cited by examiner

*Primary Examiner*—Paul N. Dickson
*Assistant Examiner*—Robert A. Coker
(74) *Attorney, Agent, or Firm*—Douglas D. Fekete

(57) ABSTRACT

An inflation device for inflating an inflatable cushion of all airbag module, the inflation device having: a first chamber having a first volume of inflation gas; a second chamber having a second volume of inflation gas; a first inflation opening for allowing the first volume of inflation gas to pass therethrough and a first sealing member, the first sealing member sealing the first inflation opening; a second inflation opening for allowing the second volume of inflation gas to pass therethrough and a mechanically activateable pyrotechnic squib sealing the second inflation opening; a diffuser tube in fluid communication with the first inflation opening, the second inflation opening and the inflatable cushion; an initiator for removing a portion of the first sealing member from the first inflation opening; a projectile moveably disposed within the diffuser tube, the projectile further comprising a tip portion configured to activate the pyrotechnic squib when the projectile is moved from a first position to a second position wherein the tip portion makes contact with the mechanically activateable pyrotechnic squib when the projectile is moved from the first position to the second position, wherein activation of the pyrotechnic squib allows fluid communication between the second chamber and the diffuser tube; and wherein the first volume of inflation gas flows from the first volume at a first flow rate and the second volume of inflation gas flows from the second volume at a second flow rate, the second flow rate being smaller than the first flow rate, wherein the second inflation gas flows from the second volume for a period of time longer than the first volume flows from the first volume and wherein the first flow rate generates a force to cause the projectile to move from the first position to the second position.

30 Claims, 3 Drawing Sheets

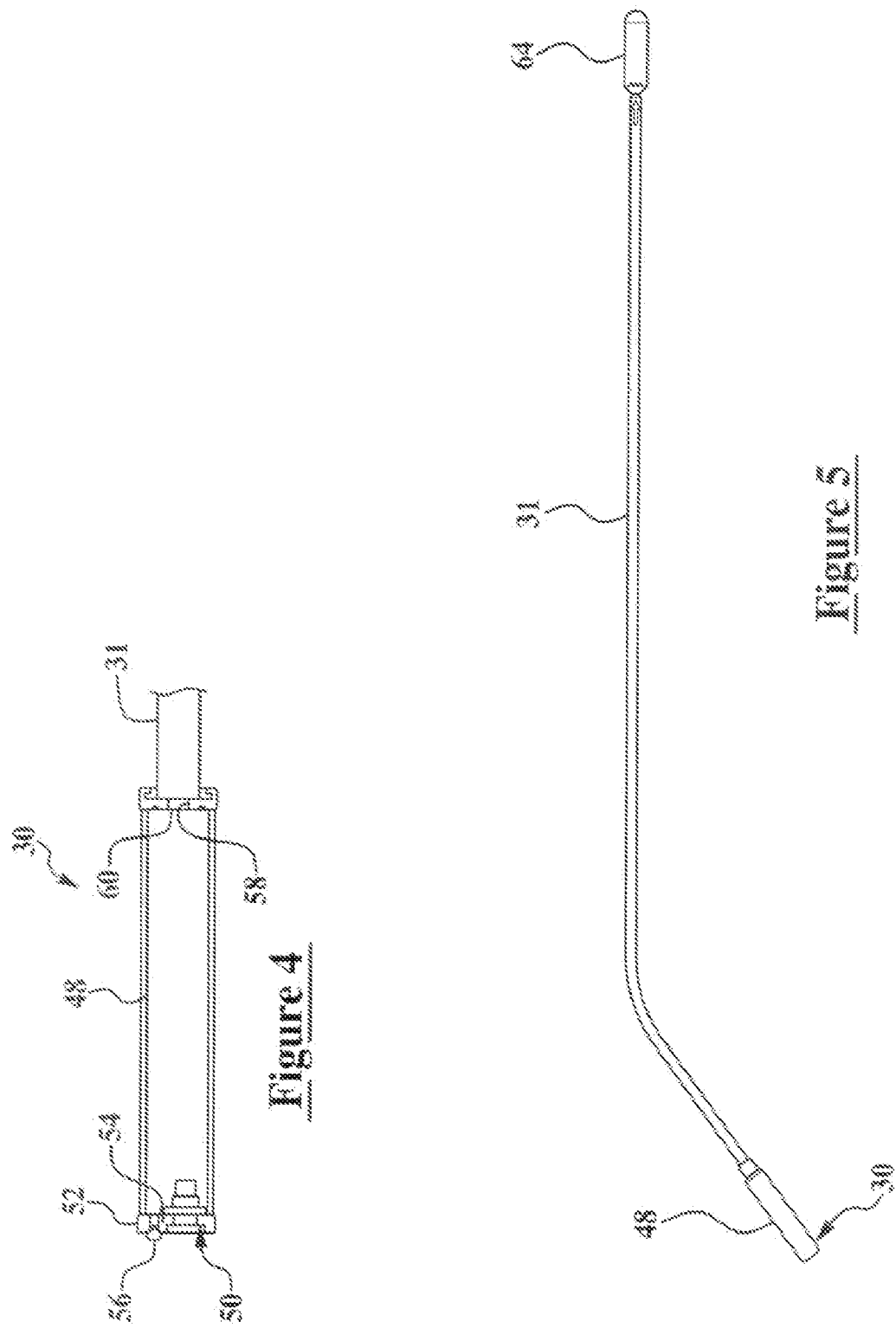

EXTENDED OUTPUT INFLATOR DEVICE

CROSS REFERENCE TO RELATED APPLICATIONS

The present invention relates to the following applications: Apparatus and Method for Providing Extended Inflator Output, Ser. No. 11/461,106; and Apparatus and Method for Providing Extended Inflator Output, Ser. No. 11/461,332, filed contemporaneously herewith, the contents each of which are incorporated herein by reference thereto.

TECHNICAL FIELD

The present invention relates to airbag devices and more particularly the present invention relates to an apparatus and method for providing extended inflator output.

BACKGROUND

Today some vehicles are supplied with side airbag modules. A side airbag module comprises inflatable cushions or curtains that traverse a side portion the vehicle when they are deployed in accordance with a predetermined activation event. Generally, the device is located along a side of the vehicle in an un-inflated state and upon activation deploys an inflatable curtain along a side portion of the vehicle. Side impact air bags or inflatable cushions are often mounted in close proximity to the vehicle's roof rail, doorframe or center pillars, or in some instances within the side door. Accordingly, the space or housing for the un-inflated airbag is compact and extends or traverses along the window area or frame, as the airbag cannot be installed in the areas comprising the window. Moreover, it is also desirable to have the inflatable cushion disposed behind a decorative trim portion of the vehicle's interior. Thus, the presence of the side airbag device is not observable to occupants when it is in its un-deployed state.

Substantial efforts have been directed to developing inflatable cushions or curtains having extended periods of inflation or in other words inflatable cushions that will retain their inflation gases for a period time after inflation. Some methods for providing this extended period of inflation is to minimize the inflation gas leakage by providing a one-piece-woven curtain airbag or by applying a sealant at the seams where the two sides of an inflatable cushion are scaled together. However, both of these methods are costly as they add additional manufacturing steps and methods.

Accordingly, it is desirable to provide an airbag module capable of providing an inflatable cushion or curtain with an extended period of inflation.

SUMMARY OF THE INVENTION

A method and apparatus for providing an extended period of inflation without incurring the additional costs of providing a specialized cushion material or sealing process and/or the costs associated with the application of an additional inflator mechanism and/or firing loop to provide the secondary inflator output is illustrated. In accordance with an exemplary embodiment, an inflator mechanism is provided wherein a first volume of gas is released into an inflatable cushion via a first inflator opening and the inflator output through the first inflator open and is used to release a second volume of gas into the inflatable cushion at a second flow rate for an extended period of time.

An inflation device for inflating an inflatable cushion of an airbag module, the inflation device having: a first chamber having a first volume of inflation gas; a second chamber having a second volume of inflation gas; a first inflation opening for allowing the first volume of inflation gas to pass therethrough and a first sealing member, the first sealing member sealing the first inflation opening; a second inflation opening for allowing the second volume of inflation gas to pass therethrough and a mechanically activateable pyrotechnic squib sealing the second inflation opening; a diffuser tube in fluid communication with the first inflation opening, the second inflation opening and the inflatable cushion; an initiator for removing a portion of the first sealing member from the first inflation opening; a projectile moveably disposed within the diffuser tube, the projectile further comprising a tip portion configured to activate the pyrotechnic squib when the projectile is moved from a first position to a second position wherein the tip portion makes contact with the mechanically activateable pyrotechnic squib when the projectile is moved from the first position to the second position, wherein activation of the pyrotechnic squib allows fluid communication between the second chamber and the diffuser tube; and wherein the first volume of inflation gas flows from the first volume at a first flow rate and the second volume of inflation gas flows from the second volume at a second now rate, the second flow rate being smaller than the first flow rate, wherein the second inflation gas flows from the second volume for a period of time longer than the first volume flows from the first volume and wherein the first flow rate generates a force to cause the projectile to move from the first position to the second position.

An airbag module, comprising: an inflatable cushion; an inflation device, the inflation device comprising: a first chamber having a first volume of inflation gas; a second chamber having a second volume of inflation gas; a first inflation opening for allowing the first volume of inflation gas to pass therethrough and a first sealing member, the first sealing member sealing the first inflation opening; a second inflation opening for allowing the second volume of inflation gas to pass therethrough and a mechanically activateable pyrotechnic squib sealing the second inflation opening; a diffuser tube in fluid communication with the first inflation opening, the second inflation opening and the inflatable cushion; an initiator for removing a portion of the first sealing member from the first inflation opening; a projectile moveably disposed within the diffuser tube, the projectile further comprising a tip portion configured to activate the pyrotechnic squib when the projectile is moved from a first position to a second position wherein the tip portion makes contact with the mechanically activateable pyrotechnic squib when the projectile is moved from the first position to the second position, wherein activation of the pyrotechnic squib allows fluid communication between the second chamber and the diffuser tube; and wherein the first volume of inflation gas flows from the first volume at a first flow rate and the second volume of inflation gas flows from the second volume at a second flow rate, the second flow rate being smaller than the first flow rate, wherein the second inflation gas flows from the second volume for a period of time longer than the first volume flows from the first volume and wherein the first flow rate generates a force to cause the projectile to move from the first position to the second position.

A method of providing extended inflation output to an inflatable cushion of an airbag module, the method comprising: supplying a first volume of inflation gas from a first inflation chamber through a first inflation opening at a first flow rate; supplying a second volume of inflation gas from a second inflation chamber through a second inflation opening at a second flow rate; wherein the first flow rate will generate a force for causing a projectile to activate a pyrotechnic squib sealing the second inflation opening, the projectile being moveably received within a conduit providing fluid communication between the first volume of inflation gas and second volume of inflation gas.

BRIEF DESCRIPTION OF THE DRAWINGS

FIG. 4 is a cross sectional view of an inflator contemplated for use in exemplary embodiments of the present invention;

FIG. 5 is a schematic view of an inflator device for use in exemplary embodiments of the present invention;

DETAILED DESCRIPTION OF EXEMPLARY EMBODIMENTS

This application relates to methods and apparatus for providing extended inflator output in vehicle airbag systems. More particularly, exemplary embodiments are directed to an apparatus that is configured to provide an extended inflator output for use with inflatable cushions.

Figure 1:
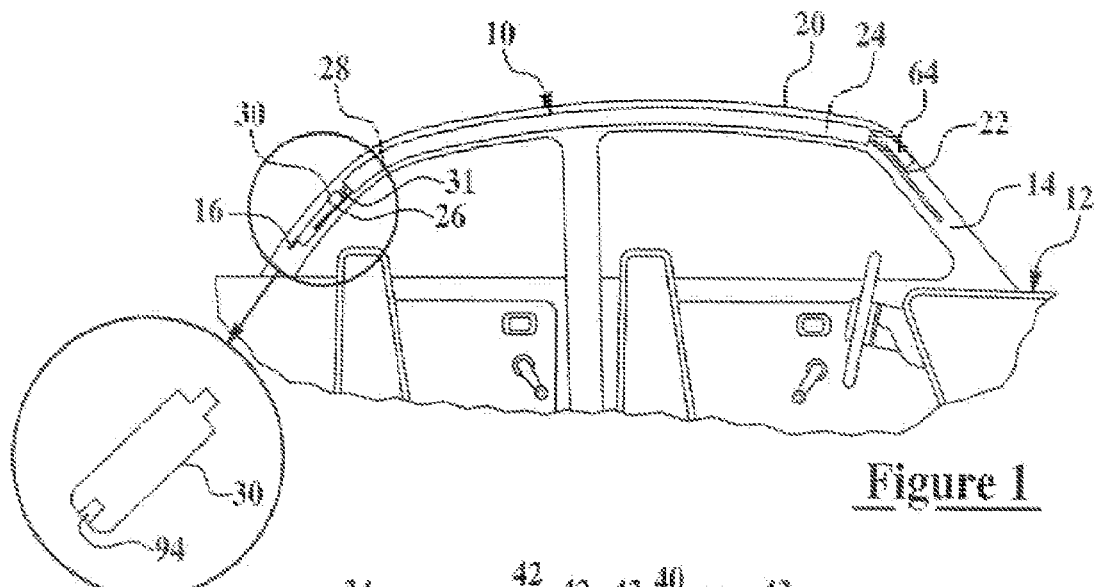
FIG. 1 is a side elevational view of an inflatable cushion in a stored position.

Referring now to FIG. 1, an inflatable cushion or airbag 10 is illustrated. Airbag 10 is manufactured and constructed in order to deploy in a variety of vehicle configurations. As discussed herein, exemplary embodiments of the present invention are related to apparatus and methods for providing extended inflator output for use with inflatable cushions. As used herein inflatable cushions are intended to refer to side curtain airbags, driver side airbags, passenger side air bags, etc. FIG. 1 provides a non-limiting example of an airbag or inflatable cushion 10 mounted to a vehicle 12 in a stored or non-deployed state. As illustrated, vehicle 12 comprises a front pillar 14, a rear pillar 16 and if the vehicle has more than one door per side, a center pillar or pillars 18 or as known to those skilled in the related arts A, B, C and D pillars. Inflatable cushion 10 is stored and mounted to or proximate to a vehicle roof rail 20 beneath a headliner. In some applications a first tether or connecting means 22 connects a front portion 24 of the inflatable cushion to the front pillar and a second tether or connecting means 26 connects a rear portion 28 of the inflatable cushion to the rear pillar.

It is, of course, understood that depending on the application requirements or configuration of the airbag device, inflatable cushion 10 may not require connecting means 22 and 26. Thus, connecting means 22 and 26 are provided as examples and the present invention is not intended to be limited by the same.

As illustrated, the rear portion of the air bag is in fluid communication with a gas generator or inflator 30 positioned to provide an inflation gas to inflate inflatable cushion 10 via a diffuser tube 31 having a plurality of diffuser openings disclosed therein. It is, of course, understood and as applications may vary, the positioning of the inflator may be located in other positions than those illustrated in the drawings. For example, the inflator may be located in a forward vehicle position. Thus, the presented location is provided as an example and the present invention is not intended to be limited by the same. In yet another alternative, the inflator may be remotely located and a conduit or other fluid providing means is used to supply the inflating gas from the inflator to the inflatable cushion.

Figure 2:
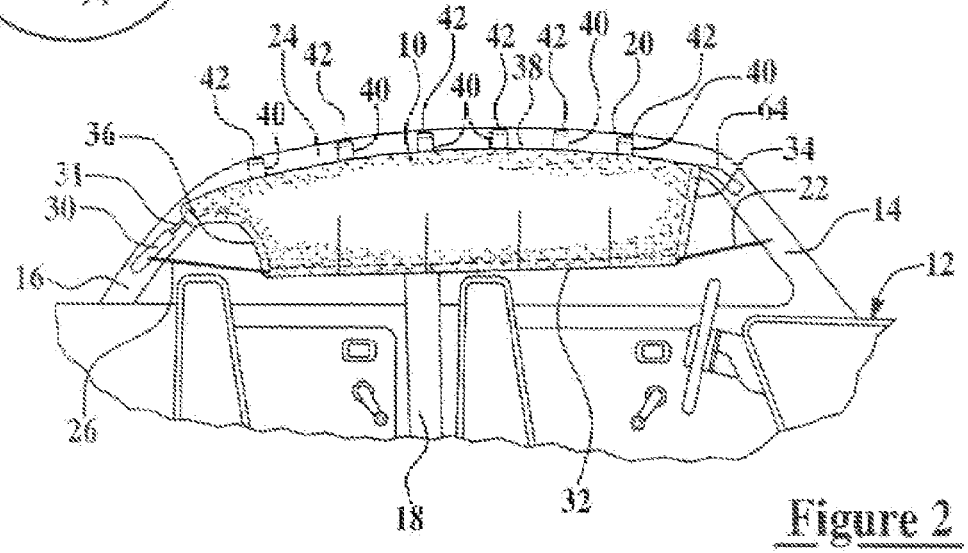
FIG. 2 is a side elevational view of an inflatable cushion in a deployed state.
Figure 3:
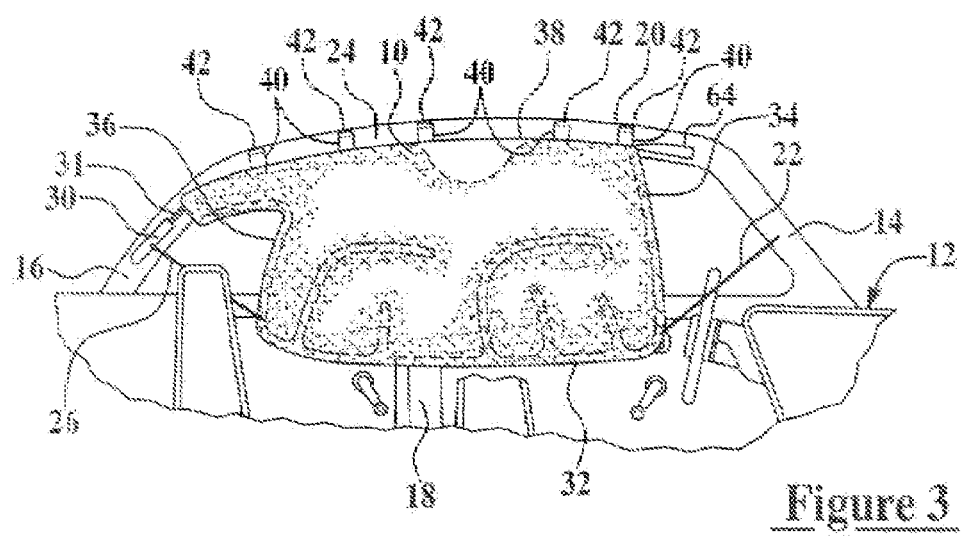
FIG. 3 is a side elevational view of another inflatable cushion in a deployed state.

FIGS. 2 and 3 illustrate inflatable cushion 10 of two different non-limiting designs in an inflated or deployed state. As illustrated in FIGS. 2 and 3, inflatable cushion 10 comprises a deploying edge 32, which comprises the bottom portion of the airbag that traverses across the window openings or window frames of the vehicle. Airbag 10 also comprises a forward edge 34, a rearward edge 36 and a fixed edge 38. Fixed edge 38 represents the portion of the airbag that remains in substantially the same position regardless of whether the airbag 10 is deployed or not.

Many different types of airbags or inflatable cushion arrangements (e.g., internal cavities, tethers or seams) are contemplated to be used with exemplary embodiments of the present invention. It is understood that the configuration of inflatable cushion 10 may vary and the illustrations in FIGS. 1 and 2 are provided as examples and the present invention is not intended to be limited to the specific configurations provided in the figures as they are considered ancillary to the present invention. Moreover, the present invention is contemplated for use with other vehicle configurations than those illustrated in FIGS. 1-2. For example, the vehicle may include three rows of seats. Such vehicles include but are not limited to sports utility vehicles, station wagons, vans or minivans. Conversely, the vehicle may comprise only a single row of seats such vehicles include but are not limited to sports coups.

The inflatable cushion may be made of any suitable air bag material for holding gas. In an exemplary embodiment, the inflatable cushion comprises two sheets of woven nylon fabric lined with urethane or other substantially impervious material such as silicone. The two urethane coated nylon sheets are secured to one another along an outer periphery thereof to define the overall air bag shape. Prior to deployment, the inflatable cushion is stored in a compartment mounted to the roof rail 24 or proximate to the roof rail as shown in FIG. 1. In order to store the airbag into the compartment the un-inflated airbag is folded into a configuration which allows it to occupy a small discrete area within the vehicle interior.

In accordance with an exemplary embodiment the fixed edge 38 comprises a plurality of mounting portions 40, which comprise a portion of the inflatable cushion and depend away from fixed edge 38. As illustrated, mounting portions 40 are each secured to an attachment apparatus 42, which in accordance with an exemplary embodiment are configured to slidably engage a feature (e.g., mounting surface, mounting aperture) of the vehicle surface that is configured to engage the attachment apparatus 42. Alternatively, fixed edge 38 may be configured to have attachment apparatus 42 secured thereto negating the need for mounting portions 40. In accordance with an exemplary embodiment, apparatus 42 is fixedly secured to the airbag via any suitable method including rivets, bolts, studs, adhesives, etc. or equivalents thereof. In one exemplary embodiment, apparatus 42 is insert molded about a portion of the inflatable cushion.

Figure 6:
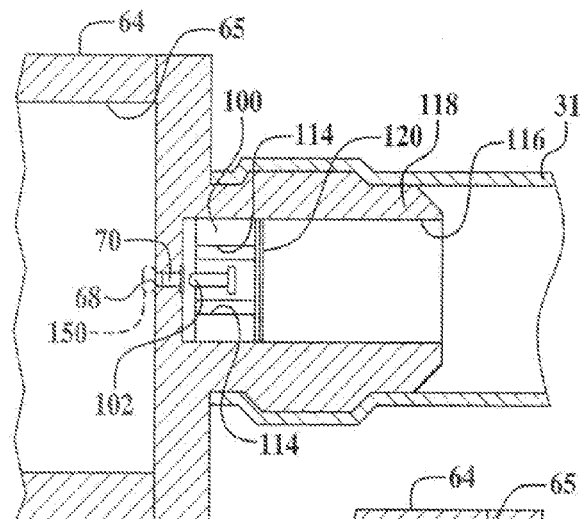
FIG. 6 is a cross sectional view of a portion of an inflator constructed in accordance with an exemplary embodiment of the present invention.

Referring now to FIGS. 4-6, an exemplary embodiment of the present invention is illustrated. Here inflator 30 comprises a first inflation chamber 48 for storing a first volume of a compressed gas for inflation of the inflatable cushion during a predetermined activation event. As illustrated, first inflation chamber 48 further comprises initiator 50 positioned at one end the first inflation chamber. In accordance with an exemplary embodiment, initiator 50 is received within an end plate 52 secured to an end of the first inflation chamber. End plate 52 is further configured to have a fill passageway 54 and a sealing means 56 secured therein after a predetermined volume of inflation gas is supplied to first inflation chamber 48. In accordance with an exemplary embodiment fill passageway 54 may be closed or plugged in any fashion that allows the first inflation chamber to be filled with a first compressed volume of inflation gas and sealed.

Inflation chamber 48 further comprises an inflation output opening 58, which is positioned to release the inflation gas stored in inflation chamber 48 upon activation of initiator 50. Disposed over inflation output opening 58 is a burst disk or first closure member 60, which is configured to open or fail upon activation of initiator 50, which in accordance with known technologies will increase the temperature and pressure of the gas stored in inflation chamber 48.

Although one specific location of initiator 50 is illustrated in the Figures initiator 50 can be positioned in any location as long as the firing of the initiator causes the first closure member 60 to be ruptured.

As is known in the related arts, initiator 50 is electrically coupled to a sensing in diagnostic module configured to receive and interpret signals from a plurality of sensors disposed within the vehicle in order to determine whether an activation signal is to be sent to initiator 50. Upon receipt of the activation signal initiator 50 will fire a small pyrotechnic charge in order to increase the temperature and pressure on a gas stored within inflation chamber 48. A non-limiting example of a gas stored in inflation chamber 48 is argon, helium, carbon dioxide and equivalents and mixtures thereof. It is of course recognized that the pressurized inflation gas may comprise one or more gasses as an alternative to or in addition to helium and argon non non-limiting examples include carbon dioxide, nitrogen and mixtures thereof as well as any other gas providing the desired output.

In accordance with an exemplary embodiment inflator 30 may comprise any type of inflator, which produces gas to inflate the air bag cushion. Non-limiting examples of inflator 30 include any inflator known to one skilled in the related arts for example, one type is a pure gas inflator wherein a pressure vessel contains stored pressurized gas (described above). The pressure vessel communicates with the cushion through various types of rupturable outlets or diaphragms. Another type is a gas generator wherein a propellant is ignited and the resultant gas created flows through an outlet to the cushion. Still another type is the hybrid or augmented type. This type includes a pressure vessel containing stored pressurized gas and a gas generator. In the hybrid type the gas generator is ignited and the resultant gas flows with and heats the stored gas going to the cushion through the pressure vessel outlet.

In accordance with an exemplary embodiment and as illustrated in FIGS. 1-6, inflation output opening 58 comprises a portion of or is in fluid communication with diffuser 31 and the diffuser or conduit is configured to be in selective fluid communication with a second inflation chamber 64 as well as providing a means for transferring the fluid from chambers 48 and 64 to the inflatable cushion. One non-limiting example would be to provide a plurality of openings in the portion of the diffuser tube that is located within the inflatable cushion. As illustrated, second inflation chamber 64 comprises a substantially smaller volume for holding a second amount of inflation gas, which is to be provided into diffuser or conduit 31 via an output orifice 68. In accordance with an exemplary embodiment, output orifice 68 is sealed via a mechanically activated pyrotechnic squib or second closure member 70 disposed in a facing space relationship with respect to a projectile 100 slidably received within diffuser tube 31. The illustrated locations and configurations of inflation chambers 48 and 64 as well as diffuser tube 31 are intended to be provided as examples and exemplary embodiments are not intended to be limited to the specific locations or configurations illustrated in the Figures.

In accordance with an exemplary embodiment, the projectile comprises a protrusion, tip or point 102 configured to activate the pyrotechnic charge 70 upon contact when the projectile is manipulated from a non-activation position to an activated position. In one non-limiting exemplary embodiment, protrusion, tip or point 102 is a hardened metal insert molded into the material of projectile 100. For example, projectile 100 may comprise a plastic material molded about a steel rivet having a head portion and protrusion, tip or point 102 configured to extend from a surface of the projectile, which makes contact with the mechanically activated pyrotechnic squib when the projectile is moved from the non-activation position to an activated position.

In accordance with an exemplary embodiment, the release of the inflation gas from first inflation chamber 48 through inflation output opening 58 causes the projectile to move from the non-activated position to the activated position thus allowing the inflation gases of the second inflation chamber to be released into output conduit 62.

Accordingly, the inflation output of first inflation chamber 48 is used to slide projectile 100 from the non-activated position the activated position wherein the protrusion, tip or puncture feature is used to fire the pyrotechnic charge disposed over output conduit 68 thereby allowing the gas of the second inflation chamber 64 to escape from chamber 64.

As illustrated, and in order to provide fluid communication from an internal chamber of second inflation chamber 64 through outlet opening 68 into the inflatable cushion (not shown), fluid conduits 114 are disposed within projectile 100. Fluid conduits 114 will provide a passageway for the inflation gases stored in second inflation chamber 64 to pass through an opening 116 of a nozzle portion 118 in fluid communication with conduit 31 and ultimately pass into the inflatable cushion.

A washer or sealing member 120 is disposed in front of projectile 100. Washer 120 will initially block openings 114 so that upon release of the gas from the first chamber a projectile 100 moves toward primer charge 70 and ultimately causes tip portion 102 to make contact with charge 70 thereby releasing the gases in chamber 64. In accordance with an exemplary embodiment, washer 120 is formed from a paper material that is easily ruptured when the gases of chamber 64 are released. Of course, exemplary embodiments of the present invention may be constructed with or without washer 120.

As illustrated, inflator output opening 58 is substantially larger than output conduit 68 thus, the inflation output from second inflation chamber 64 is at a substantially lower flow rate for an extended period of time, wherein the extended period of time is substantially longer than the period of time for the inflation gases to flow out of the first chamber. Accordingly and in accordance with an exemplary embodiment of the present invention, the first inflation chamber is used to provide an initial output for initially deploying and inflating the inflatable cushion, while the second inflation chamber is used to provide a secondary or supplemental inflation output during and after the initial inflation of the inflatable cushion. In accordance with an exemplary embodiment of the present invention, the output of the second inflation chamber is configured to counteract the leakage of the inflation gases from the inflatable cushion during initial deployment period. In other words, and in order to provide an extended period of inflation of the inflatable cushion, the first inflation chamber is used to provide an initial inflation output in order to deploy the inflatable cushion into a desired inflated configuration thereafter, any leakage of the inflation gases used to inflate the inflatable cushion are counteracted by the supplemental inflation output of the second inflation chamber as the smaller orifice of the second inflation chamber allows the supplemental inflation to be provided over a longer time period than those typically provided by release of the gases in a single stage inflator.

Moreover, and through the use of a movable projectile disposed in an output path of the first inflation chamber, the activation of the pyrotechnic squib and the subsequent release of the inflation gases stored in the second inflation chamber is achieved without requiring a secondary firing loop comprising additional logic for generation of a signal to the initiator of the second chamber, which will increase the overall costs of the airbag module. In accordance with an exemplary embodiment, the output gases of the first inflation chamber are used to move the projectile from a non-activated position to an activated position wherein the pyrotechnic squib of the second inflation chamber is mechanically activated and the gases of the second inflation chamber are allowed to trickle out at a substantially lower flow rate during the activation of the airbag module.

In accordance with an alternative exemplary embodiment and as illustrated by the dashed lines in FIG. 6, a rupturable sealing member 150 is also positioned over opening or conduit 68. In accordance with this embodiment and as the projectile is moved from the non-activation position to the activated position the tip portion 102 will contact the mechanically activatable pyrotechnic charge and the firing of the mechanically activatable pyrotechnic charge will cause sealing member 150 to rupture. As in the previous embodiment, the release of the inflation gas from first inflation chamber 48 through inflation output opening 58 causes the projectile to move from the non-activated position to the activated position thus allowing the inflation gases of the second inflation chamber to be released into output conduit 62 via the rupture of the sealing member via tip portion 102 contacting the mechanically activatable pyrotechnic charge.

Figure 7:
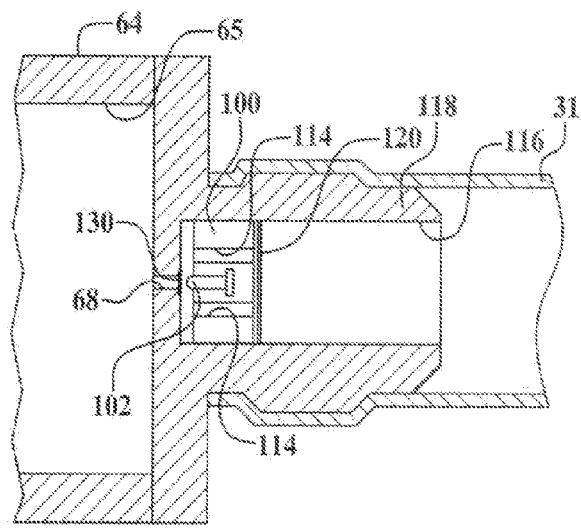
FIG. 7 is a cross sectional view of a portion of an inflator constructed in accordance with an alternative exemplary embodiment of the present invention.

Referring now to FIG. 7, an alternative exemplary embodiment is illustrated here the pyrotechnic charge is replaced by a rupturable sealing member 130 that is positioned over opening or conduit 68. In accordance with this embodiment and as the projectile is moved from the non-activation position to an activated position the tip portion 102 will rupture the sealing member. As in the previous embodiment, the release of the inflation gas from first inflation chamber 48 through inflation output opening 58 causes the projectile to move from the non-activated position to the activated position thus allowing the inflation gases of the second inflation chamber to be released into output conduit 62 via the rupture of the sealing member via tip 102.

Accordingly, the inflation output of first inflation chamber 48 is used to slide projectile 100 from the non-activated position the activated position, wherein the protrusion, tip or puncture feature is used to rupture the sealing member thereby allowing the gas of the second inflation chamber 64 to escape from chamber 64.

As in the previous embodiment, and in order to provide fluid communication from an internal chamber of second inflation chamber 64 through outlet opening 68 into the inflatable cushion (not shown), fluid conduits 114 are disposed within projectile 100. Fluid conduits 114 will provide a passageway for the inflation gases stored in second inflation chamber 64 to pass through an opening 116 of a nozzle portion 118 in fluid communication with conduit 31 and ultimately pass into the inflatable cushion.

Figure 8:
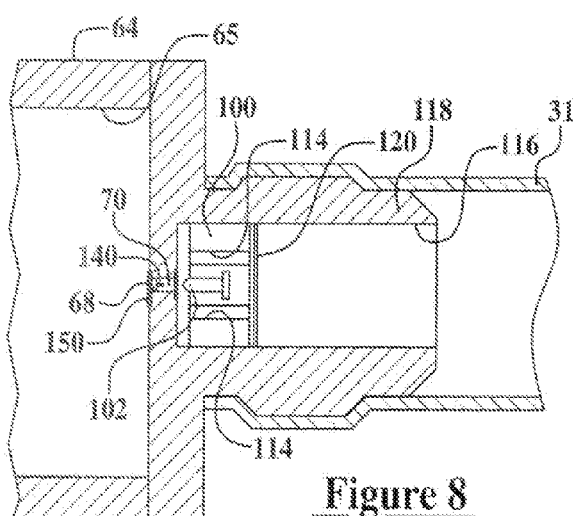
FIG. 8 is a cross sectional view of a portion of an inflator constructed in accordance with yet another alternative exemplary embodiment.

Referring now to FIG. 8, yet another alternative exemplary embodiment is illustrated. Here the pyrotechnic charge further comprises a projectile 140 which is configured to rupture a rupturable sealing member 150 that is positioned over opening or conduit 68. In accordance with this embodiment and as the projectile is moved from the non-activation position to an activated position the tip portion 102 will contact the pyrotechnic charge and fire the projectile into the sealing member. As in the previous embodiments, the release of the inflation gas from first inflation chamber 48 through inflation output opening 58 causes the projectile to move from the non-activated position to the activated position thus allowing the inflation gases of the second inflation chamber to be released into output conduit 62 via the rupture of the sealing member via tip portion 102 contacting the pyrotechnic charge.

Accordingly, the inflation output of first inflation chamber 48 is used to slide projectile 100 from the non-activated position the activated position wherein the protrusion, tip or puncture feature is used to rupture the sealing member thereby allowing the gas of the second inflation chamber 64 to escape from chamber 64.

As in the previous embodiments, and in order to provide fluid communication from an internal chamber of second inflation chamber 64 through outlet opening 68 into the inflatable cushion (not shown), fluid conduits 114 are disposed within projectile 100. Fluid conduits 114 will provide a passageway for the inflation gases stored in second inflation chamber 64 to pass through an opening 116 of a nozzle portion 118 in fluid communication with conduit 31 and ultimately pass into the inflatable cushion.

While the invention has been described above making specific reference to embodiments wherein the first chamber, the diffuser chamber and the second chamber, are longitudinally aligned, the broader practice of the invention is not necessarily so limited.

It is also understood that the configuration of the inflatable cushions may vary and the illustrations of the cushion in the Figures are provided as examples and the present invention is not intended to be limited to the specific configurations provided in the figures, as they are considered ancillary to the present invention.

Moreover, the present invention is contemplated for use with numerous other vehicle configurations. For example, the vehicle may include three rows of seats; such vehicles include but are not limited to sports utility vehicles, station wagons, vans or minivans. Conversely, the vehicle may comprise only a single row of seats such vehicles include but are not limited to sports coups. Therefore, the above-described airbag module may be easily modified to accommodate all types of vehicles in several different types of configurations.

Furthermore, prior to deployment, the inflatable cushion may be stored in a compartment mounted to the roof rail or proximate to the roof rail. In order to store the airbag into the compartment the un-inflated inflatable cushions are folded into configurations, which allow it to occupy small discrete areas within the vehicle interior.

When a predetermined activation event or occurrence is detected, the inflatable cushion is inflated by gas from the inflator. In general, the inflator will receive an inflation or deployment signal that causes the inflator to generate an inflation gas or inflation output for inflating the inflatable cushion. In the exemplary embodiments described above, the deployment signal is generated by a controller, such as a microcontroller of a sensing and diagnostic module configured for use with the airbag module. The sensing and diagnostic module receives a plurality of signals from appropriate sensing devices (e.g., door mounted accelerometers), and will generate a deployment signal if a predetermined activation event has been sensed.

Accordingly, exemplary embodiments of the present invention provide a method and apparatus for providing an extended period of inflation without incurring the additional costs of providing a specialized cushion material or sealing process and/or the costs associated with the application of an additional inflator mechanism and/or firing loop to provide the secondary inflator output is illustrated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. An inflation device for inflating an inflatable cushion of an airbag module, the inflation device comprising:
   a first chamber having a first volume of inflation gas;
   a second chamber having a second volume of inflation gas;
   a first inflation opening for allowing the first volume of inflation gas to pass therethrough and a first sealing member, the first sealing member sealing the first inflation opening;
   a second inflation opening for allowing the second volume of inflation gas to pass therethrough and a mechanically activateable pyrotechnic squib sealing the second inflation opening;
   a diffuser tube in fluid communication with the first inflation opening, the second inflation opening and the inflatable cushion;
   an initiator for removing a portion of the first sealing member from the first inflation opening;
   a projectile moveably disposed within the diffuser tube, the projectile further comprising a tip portion configured to activate the pyrotechnic squib when the projectile is moved from a first position to a second position wherein the tip portion makes contact with the mechanically activateable pyrotechnic squib, wherein activation of the pyrotechnic squib allows fluid communication between the second chamber and the diffuser tube; and
   wherein the first volume of inflation gas flows from the first chamber at a first flow rate and the second volume of inflation gas flows from the second chamber at a second flow rate, the second flow rate being smaller than the first flow rate, and wherein the first flow rate generates a force to cause the projectile to move from the first position to the second position.

2. The inflation device as in claim 1, wherein the first volume of inflation gas comprises helium and the second volume of inflation gas comprises argon.

3. The inflation device as in claim 1, wherein the first volume of inflation gas is selected from the group comprising helium, argon, carbon dioxide and mixtures thereof and the second volume of inflation gas is selected from the group comprising helium, argon, carbon dioxide, nitrogen and mixtures thereof and the second flow rate has a duration longer than a duration of the first flow rate.

4. The inflation device as in claim 3, wherein the projectile further comprises a fluid passageway disposed therein, the fluid passageway providing fluid communication between diffuser tube and the second chamber.

5. The inflation device as in claim 4, further comprising a deployable washer disposed in the diffuser tube, wherein the projectile is located between the deployable washer and the second inflation opening.

6. The inflation device as in claim 1, further comprising a deployable washer disposed in the diffuser tube, wherein the projectile is located between the deployable washer and the second inflation opening and wherein the projectile further comprises a plurality of fluid passageways disposed therein, the fluid passageways providing fluid communication between diffuser tube and the second chamber.

7. The inflation device as in claim 6, wherein the first chamber is located at one end of the diffuser tube and the second chamber is located at an opposite end of the diffuser tube.

8. The inflation device as in claim 1, wherein the first chamber is located at one end of the diffuser tube and the second chamber is located at an opposite end of the diffuser tube.

9. The inflation device as in claim 1, wherein the second inflation opening is also sealed by a ruptureable sealing member and the mechanically activateable pyrotechnic squib further comprises another projectile, which ruptures the ruptureable sealing member after activation of the mechanically activateable pyrotechnic squib.

10. The inflation device as in claim 9, wherein the first volume of inflation gas is selected from the group comprising helium, argon, carbon dioxide, nitrogen and mixtures thereof and the second volume of inflation gas is selected from the group comprising helium, argon, carbon dioxide, nitrogen and mixtures thereof and wherein the projectile further comprises a fluid passageway disposed therein, the fluid passageway providing fluid communication between diffuser tube and the second chamber.

11. The inflation device as in claim 10, further comprising a deployable washer disposed in the diffuser tube, wherein the projectile is located between the deployable washer and the second inflation opening.

12. An airbag module, comprising:
   an inflatable cushion;
   an inflation device, the inflation device comprising:
   a first chamber having a first volume of inflation gas;
   a second chamber having a second volume of inflation gas;
   a first inflation opening for allowing the first volume of inflation gas to pass therethrough and a first sealing member, the first sealing member sealing the first inflation opening;
   a second inflation opening for allowing the second volume of inflation gas to pass therethrough and a mechanically activateable pyrotechnic squib sealing the second inflation opening;
   a diffuser tube in fluid communication with the first inflation opening, the second inflation opening and the inflatable cushion;
   an initiator for removing a portion of the first sealing member from the first inflation opening;

a projectile moveably disposed within the diffuser tube, the projectile further comprising a tip portion configured to activate the pyrotechnic squib when the projectile is moved from a first position to a second position wherein the tip portion makes contact with the mechanically activateable pyrotechnic squib, wherein activation of the pyrotechnic squib allows fluid communication between the second chamber and the diffuser tube; and wherein the first volume of inflation gas flows from the first chamber at a first flow rate and the second volume of inflation gas flows from the second chamber at a second flow rate, the second flow rate being smaller than the first flow rate, wherein the first flow rate generates a force to cause the projectile to move from the first position to the second position.

13. The airbag module as in claim 12, wherein the first volume of inflation gas comprises helium and the second volume of inflation gas comprises argon and the second flow rate has a duration longer than a duration of the first flow rate.

14. The airbag module as in claim 12, wherein the first volume of inflation gas is selected from the group comprising helium, argon, carbon dioxide, nitrogen and mixtures thereof and the second volume of inflation gas is selected from the group comprising helium, argon, carbon dioxide, nitrogen and mixtures thereof.

15. The airbag module as in claim 14, wherein the projectile further comprises a fluid passageway disposed therein, the fluid passageway providing fluid communication between diffuser tube and the second chamber.

16. The airbag module as in claim 15, further comprising a deployable washer disposed in the diffuser tube, wherein the projectile is located between the deployable washer and the second inflation opening.

17. The airbag module as in claim 12, further comprising a deployable washer disposed in the diffuser tube, wherein the projectile is located between the deployable washer and the second inflation opening and wherein the projectile further comprises a plurality of fluid passageways disposed therein, the fluid passageways providing fluid communication between diffuser tube and the second chamber.

18. The airbag module as in claim 12, wherein the first chamber is located at one end of the diffuser tube and the second chamber is located at an opposite end of the diffuser tube.

19. The airbag module as in claim 12, wherein the first chamber is located at one end of the diffuser tube and the second chamber is located at an opposite end of the diffuser tube.

20. The airbag module as in claim 12, wherein the second inflation opening is also sealed by a ruptureable sealing member and the mechanically activateable pyrotechnic squib further comprises another projectile, which ruptures the ruptureable sealing member after activation of the mechanically activateable pyrotechnic squib.

21. The airbag module as in claim 20, wherein the first volume of inflation gas is selected from the group comprising helium, argon, carbon dioxide, nitrogen and mixtures thereof and the second volume of inflation gas is selected from the group comprising helium, argon, carbon dioxide, nitrogen and mixtures thereof and wherein the projectile further comprises a fluid passageway disposed therein, the fluid passageway providing fluid communication between diffuser tube and the second chamber.

22. The airbag module as in claim 21, further comprising a deployable washer disposed in the diffuser tube, wherein the projectile is located between the deployable washer and the second inflation opening.

23. A method of providing extended inflation output to an inflatable cushion of an airbag module, the method comprising:

supplying a first volume of inflation gas from a first inflation chamber through a first inflation opening at a first flow rate;

supplying a second volume of inflation gas from a second inflation chamber through a second inflation opening at a second flow rate;

generating from the first flow rate a force for causing a projectile to activate a pyrotechnic squib sealing the second inflation opening, the projectile being moveably received within a conduit providing fluid communication between the first volume of inflation gas and second volume of inflation gas.

24. The method as in claim 23, wherein the first volume of inflation gas is selected from the group comprising helium, argon, carbon dioxide, nitrogen and mixtures thereof and the second volume of inflation gas is selected from the group comprising helium, argon, carbon dioxide, nitrogen and mixtures thereof.

25. The method as in claim 24, wherein the projectile further comprises a fluid passageway disposed therein, the fluid passageway providing fluid communication between conduit and the second chamber.

26. The method as in claim 23, wherein a deployable washer is disposed in the conduit and wherein the projectile is located between the deployable washer and the second inflation opening.

27. The method as in claim 23, wherein the second inflation opening is also sealed by a ruptureable sealing member and the mechanically activateable pyrotechnic squib further comprises a projectile, which ruptures the ruptureable sealing member after activation of the mechanically activateable pyrotechnic squib.

28. An inflation device for inflating an inflatable cushion of an airbag module, the inflation device comprising:

a projectile moveably disposed within a diffuser tube of the inflation device;

a first chamber having a first volume of inflation gas, the first chamber being in fluid communication with the diffuser tube when a sealing member of the first chamber is ruptured;

a second chamber having a second volume of inflation gas, the second chamber being in fluid communication with the diffuser tube when a pyrotechnic squib is activated by movement of the projectile into the pyrotechnic squib by the first volume of inflation gas as it flows into the diffuser.

29. The inflation device as in claim 28, wherein the first volume of inflation gas is selected from the group comprising helium, argon, carbon dioxide, nitrogen and mixtures thereof and the second volume of inflation gas is selected from the group comprising helium, argon, carbon dioxide, nitrogen and mixtures thereof and the projectile further comprises a fluid passageway disposed therein, the fluid passageway providing fluid communication between conduit and the second chamber.

30. The inflation device as in claim 28, wherein the first volume of inflation gas flows into the diffuser tube at a first flow rate and the second inflation gas flows into the diffuser tube at a second flow rate, the first flow rate being greater than the second flow rate and the second flow rate having a duration longer than a duration of the first flow rate.

* * * * *